Patented Jan. 10, 1939

2,143,468

UNITED STATES PATENT OFFICE 2,143,468

BLOCK FOR GERMINATING SEEDS AND GROWING PLANTS AND MANUFACTURE OF SUCH BLOCK

Henry C. Avery, West Springfield, Mass., assignor to The Osmo Garden Company, Philadelphia, Pa., a corporation of Delaware No Drawing. Application September 11, 1936, Serial No. 100,313

4 Claims. (Cl. 47—1)

This invention relates to blocks intended for germinating seeds and growing plants and to the manufacture of such blocks. It deals with blocks containing sand as an essential ingredient and with the molding of blocks possessed of the all-round qualities requisite for their being handled and shipped, their serving as the medium in which seeds are germinated and plants grown, and their being transferred to the soil for ultimate or maximum plant development.

It is generally accepted by horticulturists that sand is a highly desirable medium for germinating seeds or starting seedlings in that strong roots are developed. One theory for explaining such development of strong roots is that the sand tends to scratch or irritate the roots and thus to stimulate their growth. Within recent years, it has been shown that plants may be grown to full size or maturity in sand by supplying nutriment in properly controlled amount to the sand. However, such a method is limited at the present time in its application to the growing of plants on greenhouse benches or in trays whose sand layer is periodically sprinkled or wetted down with solutions of fertilizer salts or nutriment in controlled concentration. Because sand holds or retains only about 20% of water after the free water has been permitted to drain therefrom, it becomes necessary to supply water to the sand very frequently with the attendant labor and other costs.

In accordance with the present invention, I provide a seed-germinating and plant-growing block that contains sand as its essential ingredient and that not only possesses all the advantages of loose sand as a seed-germinating and plant-growing medium but presents many other important advantages, including its ability to hold or retain much more water than loose sand, its ability to be handled and shipped along with the plant grown therein without crumbling, and its capacity when partially submersed in water to maintain its integrity and shape while transferring water by capillarity to the seeds or plant roots contained therein. The latter advantage means that seeds or seedlings contained therein are not subject to being dislodged or washed away under top-watering such as is effected when loose sand is employed as the germinating or growing medium. Again, the block hereof as initially produced constitutes a sterile medium wherein seedlings are given a healthy start; and it hence minimizes "dampening off", the disease most dreaded in the case of seedlings.

Broadly stated, the blocks hereof are made by casting or molding a composition comprising an aqueous slurry of sand as the greatly preponderant non-aqueous component and an initially water-soluble binder capable of setting to an essentially water-insoluble condition and then drying the molded composition. The binder employed herein should be innocuous to seeds or seedlings; and for this purpose I have found that albuminous binder, such as can be economically prepared from scrap leather or leatherboard, may be used to excellent advantage. Accordingly, I shall first describe the manufacture of the blocks hereof in terms of the derivation of their albuminous binder content from scrap leather.

Pursuant to a preferred method of the present invention, scrap leather or leatherboard is placed together with ample water in the usual beater engine or hollander and is disintegrated or beaten therein until an aqueous suspension of leather fibers comparable to that entering into leatherboard is produced. The beaten leather stock or aqueous suspension of leather fiber as thus produced may be made up by weight of one part of dry leather fiber and four parts of water; or water may be drained therefrom to produce a stock of such consistency. The beaten leather stock is mixed at such consistency in the beater engine or in a mixing tank to produce a composition containing non-aqueous components by weight as follows:

| | Parts |
|---|---|
| Dry leather fiber | 100 |
| Sand (fine and gritty quality) | 600 |
| Charcoal (about 20 mesh or somewhat finer) | 50 |
| Hydrated lime | 10 |

Sufficient water, in addition to that accompanying the beaten leather stock, is added to the composition to form a thick slurry and the composition is heated, as it is being mixed or agitated, to about 180° to 200° F., at which temperature it is kept for, say, about one-half hour. Not only does the heat sterilize the composition and promote neutralizing reaction of the lime upon such tannic acid or other free acid constituents as may be present in the leather fiber, but the leather fiber is partially glutinized to form sufficient albuminous binder to bond together strongly the solid components of the composition when the composition is cast into blocks and the blocks are set or dried.

The resulting slurry while hot is poured or cast into molds whose bottoms are foraminous and thus permit the drainage of free or excess aqueous medium. No pressure is applied to the cast blocks, as it is desirable that the blocks when dried contain considerable voids or interstices throughout their structure so as to induce ready capillary diffusion of water therethrough and to permit unimpeded growth and penetration of seedling or plant roots therein and therethrough. Once the blocks have been cast and excess aqueous medium drained through the mold bottoms, they may be permitted to set or congeal under prevailing temperature conditions; or, if desired, setting of the blocks may be accelerated by exposing them to a dry heated atmosphere. The drying temperature for the blocks should preferably be below that injurious to the leather fibers dispersed therethrough, as the leather fibers together with the glutinous binder derived therefrom and present thereon are relied upon to integrate or bond together the sand granules into tough coherent blocks, which, as already indicated, do not tend to disintegrate in the presence of water and may be handled and shipped without danger of crumbling. The cooling of the molded composition is attended by settling or gelling of the glutinous binder; and, because of the strong bond of the set or gelled binder, it is possible to remove the molded blocks in wet or only partly dried condition from the molds without danger of fracturing them. For household seed germination, the size of the blocks may conveniently be about 2x2x2", but it is obvious that any desired size or shape of block may be produced in accordance with the present invention. Thus, the blocks may be of a shape simulating the ordinary clay flower pots, especially when sizable plants are to be grown and maintained therein for a comparatively long period; or they may be made to simulate other objects, such as animals, vases, lamps, etc., on which grass, flowers, etc., may be grown in artistic arrangement to afford unique articles of ornament of considerable commercial worth. It is also desirable for many purposes to mold or cast the composition hereof as large-sized slabs for use in the conventional so-called seed flats, for instance, into slabs whose dimensions are 18x20x1½". Smaller uniform slabs or sections of, say, one-quarter such size, may also be formed so that they may be placed side by side to fill a standard seed flat. The small-sized slabs or sections are of especial value when they are to be shipped from a factory to a greenhouse or other destination. In using such slabs, it is desirable to leave out a small corner area in the slab or in a corner section and thus to provide a recess or vacant space for receiving the water supply for nourishing the seeds or plants especially when washing away of seeds or seedlings by top-watering is to be avoided.

The dried blocks are rigid, porous, and of comparatively light weight. During drying, they tend to shrink to a size slightly smaller than the molds in which they were cast, but, once the extent of such shrinkage has been determined, it is possible to employ molds for producing blocks of the desired final dimensions. When partially submersed in water, the dried blocks display their good water-absorbing and water-diffusing properties, and the rapid rise in water therethrough is discernible by the dark hue of the moistened lower block portions as contrasted with the comparatively light hue of the still dry upper block portions to which the water has not diffused. Although the partially glutinized leather fibers serving to bond together the sand granules permit water to diffuse therethrough, nevertheless, the glutinous binder is not measurably leached out of the blocks and the blocks retain their integrity and shape indefinitely in water.

The example of procedure hereinbefore given is subject to wide variations especially in respect of the proportionality between the leather fiber and sand components of the block-molding composition. I have found it preferable, however, to use the sand in the proportion by weight of about 300 to 1000 parts to 100 parts of leather fiber. A greater proportion of sand than 1000 parts gives rise to undue fragility in the resulting block, whereas less than 300 parts of sand leads to excessive hardness in the blocks such as may inhibit in the case of some plants proper root penetration and development therein. While it is desirable to use charcoal in substantial amount in the block-molding composition because it promotes the formation of voids and interstices in the block and lightens the weight of the block per unit of volume, nevertheless, this ingredient is not necessary and may be omitted altogether from the composition hereinbefore described. The block-forming composition hereof may contain fibrous material in addition to leather, for instance, asbestos, wool, hair, etc. I prefer, however, to avoid the inclusion therein of an appreciable amount of cellulose fiber, such as wood pulp, for cellulose fiber as it undergoes decomposition in the presence of water is apt to become a carrier of nitrogen-consuming bacteria that detract from the nitrogenous nutriment in the block that would otherwise be absorbed by the seedling or plant roots. In the event that cellulose fiber is included in the block-forming composition hereof, it is desirable to treat such fiber with a suitable fungicidal chemical, such as sodium silico-fluoride ($Na_2SiF_6$), which inhibits the decomposition of the fiber and also the generation of the nitrogen-consuming bacteria or other spores, fungi, and bacteria inimical to plant growth.

It is possible to dispense with leather as the source of binder for the blocks hereof and to use in its stead already-prepared glue or equivalent albuminous binder, in which latter case it is desirable that the glue be set or dried to an essentially water-insoluble condition, as by the admixture therewith of an appropriate amount of formaldehyde, tannin, or similar insolubilizing or tanning agent. Thus, a 10% aqueous solution of glue may be treated with about 3% of formaldehyde, based on dry glue solids, whereupon 100 parts by weight of dry glue solids in the form of the resulting formaldehyde-treated glue solution may be mixed under heat with, say, about 500 parts of sand and about 50 parts of charcoal and the hot composition cast or molded into blocks as hereinbefore described. The finished or dried blocks are somewhat less absorbent than those realized when leather fiber is included in the block-forming composition, as hereinbefore described. Blocks of higher absorbency may, however, be produced by mixing shredded leather, cellulose fiber or sawdust preferably treated with fungicidal chemical, asbestos, wool, hair, peat moss, or the like with a block-forming composition containing an already-prepared glue solution. During setting or drying of the molded blocks, the glue is insolubilized or tanned so as to impart the desired wet-integrity to the finished blocks. In some instances, the insolubilization or tanning of the glue content of the molded blocks may be effected by exposing the blocks during drying to an atmosphere of formaldehyde vapors or other insolubilizing agent rather than including the insolubilizing agent in the block-molding composition. It is further possible to rely upon wool, hair, or similar nitrogen fibrous material as the source of the glutinous binder, in lieu of so relying upon leather fibers, but, by reason of the availability at low cost of scrap leather, such latter material is preferred.

It is possible to control the pH value of the block-molding composition to best suit the particular seedlings or plants to be grown therein; and, if desired, fertilizing ingredients besides those yielded by the leather fiber itself may be added to the composition. Thus, fertilizing salts or salt solutions may be sprinkled onto the surface of the block surfaces or added to the water in which the blocks are partially submersed, in consequence of which such salts are carried along by capillary action with the water to the seedling or plant roots so as to stimulate fast plant growth. It is usually desirable to wrap the side walls of the blocks with suitable waterproof material so as to minimize evaporation of water thereat while the blocks are partially submersed in water and moisture is rising therethrough by capillary action to the seeds, seedlings, or plants contained therein. The bottom-watering of seeds and roots, unlike top-watering, does away with the danger of exposing the seeds or roots to excess water and thus causing their rotting.

When tiny seeds are planted in the blocks hereof, the best results are had by placing the seeds on the top surface, covering them completely with a thin layer of sand of the thickness appropriate for the particular seeds, and setting the blocks in saucers or trays in the presence of water in amount sufficient only partially to submerse them. In the case of beans, peas, or other large sized seeds, before planting, it is preferable to gouge out, as with a pointed knife, in the top of the block a hole of a size large enough to receive the entire seed below the top surface, whereupon the seed is planted in the hole and covered with sand or the gouged-out block material. The seeds thus planted are preferably germinated in the absence of sunlight in a warm room, the temperature of which may be controlled to serve best the particular seeds being germinated. When the seeds have fully germinated or sprouted, the blocks containing the seedlings should be brought into the sunlight so as to avoid spindly growth. At this stage of plant development, the water in which the blocks are set may be treated with fertilizer in properly controlled amount, for it is generally undesirable to fertilize seeds during germination. The seedlings may be permitted to grow in the blocks until they are well-rooted, at which time the blocks may be transplanted together with the growing plants in a clay pot or in the ground outdoors. In transplanting, the waterproof wrapper about the block should be removed preparatory to placing the block in the soil. In due time, the plant roots penetrate through the side walls of the block into the soil; and, in so doing, the blocks are ruptured or burst asunder and become part of the soil.

The blocks hereof may be used advantageously for starting slips or cuttings as well as for germinating seeds. Thus, a hole may be bored in the top of the block and the slip or cutting inserted therein. Sand or the removed block material may then be firmly packed around the base of the stem preparatory to setting the block in water. The blocks hereof may be used not only for germinating seeds, developing slips or cuttings, and growing plants, but also as the media wherein seedlings or plants are shipped economically in excellent health from a greenhouse or other horticultural center to householders for use as miniature gardens, window displays, or for transplanting in clay pots or in the ground outdoors. The blocks hereof may also advantageously serve the purpose of testing the germination of seeds.

In accordance with another phase of the present invention, I provide a seed-germinating and plant-growing medium which contains sand as its essential component but which, rather than being molded into blocks, is used in bulk, loose condition. As hereinbefore indicated, sand alone, although desirable for strong root development, presents the drawback as a seed-germinating and plant-growing medium in that it holds or retains comparatively little water and further in that seeds or seedlings embedded therein are apt to be dislodged or washed away by heavy rain or an abundance of water. The bulk, loose compositions hereof are, like the molded blocks hereof, characterized by the presence therein of a distinctly subordinate proportion of fiber, preferably substantially dry leather fiber, such as is produced by shredding leather scrap in a hammermill or other suitable disintegrating machine. Thus, the loose or granular composition hereof may be made up of about 600 parts of sand (dry basis) and about 100 parts of substantially dry shredded leather; and, if desired, the homogeneous admixture of the sand and leather fiber may additionally contain, say, about 50 to 100 parts of ground charcoal of about 20 or somewhat finer mesh. In some instances, the substantially uniform admixture of the various ingredients may be advantageously effected in water, in which case, the leather scrap may first be reduced to the desired fibrous or granular condition by beating in an appropriate amount of water, whereupon the sand and charcoal may be added to the aqueous suspension of beaten leather fiber and the suspension of mixed solids then dewatered to substantially complete dryness and disintegrated, as in a hammermill, to form the desired loose or granular composition hereof. If desired, the aqueous suspension of mixed solids may be heated to a temperature sufficiently high to ensure substantial sterility in the finished bulk, granular composition. Again, a suitable proportion of lime or other alkali may be added to the aqueous suspension of mixed solids so as to neutralize such tannic acid or other free acid constituents, saponify grease, etc., as may be associated with the leather scrap serving as raw material. When alkali is used as a neutralizing agent in preparing the bulk, granular compositions hereof, it is preferable that the amount of alkali be controlled to minimize the generation of glutinous substance from the leather fiber, since glutinous substance tends to bond together the mixed solids during the subsequent dewatering or drying of the composition and thus to render more difficult the disintegration of the dried mass to the desired final granular or loose condition. Of course, the pH value in the aqueous suspension of mixed solids may be controlled to lead to a finished granular composition best adapted for the particular seedlings or plants to be grown therein.

The loose or granular compositions hereof are intended more especially for outdoor use, for which purpose it is desirable to have a seed-germinating and plant-growing medium which lends itself to ready application over a large soil area and which may be spread as a top layer conformable with a trench or row in which seeds are to be planted. The leather fiber component of the granular composition hereof imparts the desired high water-holding capacity to the composition as well as furnishing therein fertilizing ingredients for the seedlings or plants grown therein. Indeed, the bulk compositions hereof when prepared as already described may hold or retain water in the amount of 350% or greater than that retained by the same dry weight of sand alone. Moreover, the leather fiber enmeshes or entraps the sand granules and so prevents erosion or washing away of the sand and/or tender seedlings rooted therein; and, once having been wet down with water, it serves to blanket and hold down the soil so as to minimize soil erosion either by water or wind and water-evaporation from the soil. As in the case of the molded blocks hereof, the bulk, granular composition hereof may contain suitable fibrous material in lieu of part or all of the leather fiber, for instance, such fibrous materials as asbestos, wool, cellulose pulp, hair, peat moss, or the like; and the bulk, granular compositions hereof may also include suitable fertilizer salts or solutions thereof, commercial fertilizers of the nature of bone meal, superphosphates, fish meal, etc.

I claim:

1. A seed-germinating and plant-growing medium consisting of a molded block containing sand granules and leather fibers in partially glutinized condition serving to impart to said block integrity in the presence of water, said block being of such porosity as to absorb water and to permit water to diffuse readily by capillarity from one portion thereof to another.

2. A seed-germinating and plant-growing medium consisting of a molded block containing sand granules, ground charcoal, and leather fibers in partially glutinized condition serving to impart to said block integrity in the presence of water, said block being of such porosity as to absorb water and to permit water to diffuse readily by capillarity from one portion thereof to another.

3. A seed-germinating and plant-growing medium consisting of a molded block containing sand granules as a greatly preponderant component and leather fibers in partially glutinized condition imparting to said block integrity in the presence of water, said block being of such porosity as to absorb water and to permit water to diffuse readily by capillarity from one portion thereof to another.

4. A method of producing a seed-germinating and plant-growing medium in block form, which comprises reducing leather scrap in water to form an aqueous fibrous suspension, mixing said suspension of fiber with a greatly preponderant proportion of fine sand under heat and in the presence of lime until said fiber has been partially gelatinized, molding the resulting aqueous composition into porous blocks, and drying the molded blocks.

HENRY C. AVERY.